United States Patent [19]

Itoh et al.

[11] Patent Number: 4,903,206
[45] Date of Patent: Feb. 20, 1990

[54] SPELLING ERROR CORRECTING SYSTEM

[75] Inventors: Nobuyasu Itoh, Kawasaki; Hiroyasu Takahashi, Yokohama, both of Japan

[73] Assignee: International Business Machines Corporation, Armonk, N.Y.

[21] Appl. No.: 150,960

[22] Filed: Feb. 1, 1988

[30] Foreign Application Priority Data

Feb. 5, 1987 [JP] Japan .................................. 62-23706

[51] Int. Cl.⁴ .......................... G06F 15/21; G06F 7/04
[52] U.S. Cl. .................................. 364/419; 364/225.8; 364/943.41
[58] Field of Search .......................... 364/419, 200 MS

[56] References Cited

U.S. PATENT DOCUMENTS 4,328,561 10/1982 Convis et al. ........................ 364/900

OTHER PUBLICATIONS

Blair, C., "A Program for Correcting Spelling Errors", Information and COntrol 3, 1, Mar. 1960, pp. 60–67.
Peterson, J., "Computer Programs for Detecting and Correcting Spelling Errors", Communications of the ACM, Dec. 1980, vol. 23, No. 12, pp. 676–687.
W. S. Rosenbaum & J. J. Hilliard, "Multifont OCR Postprocessing System", *IBM Journal of Research and Development*, Jul. 1975, vol. 19, No. 5, pp. 398–421.

*Primary Examiner*—Jerry Smith
*Assistant Examiner*—Stephen M. Baker
*Attorney, Agent, or Firm*—Joseph C. Redmond, Jr.

[57] ABSTRACT

Preselection of words for spelling error check utilizes unique attribute information of words. The attribute information is generated for each vocabulary word and each vocabulary word is classified based on the attribute information and then stored in the dictionary. The attribute information is generated by obtaining character categories for each vocabulary word, ordering the character categories with a predetermined criterion, taking a leading character categories, and then generating one or more combinations of m character categories from the n leading character categories, which combinations being the attribute information. For an inputted character string to be checked, the attribute information is also generated, and the vocabulary words included in one or more classes specified by the attribute are selected as the candidate words for the correct word.

7 Claims, 4 Drawing Sheets

PROCESS OF CLASS GENERATING PORTION

SYSTEM OF EMBODIMENT

CONFIGURATION OF
POST-PROCESSING PORTION

STRUCTURE OF DICTIONARY

SPELLING ERROR CORRECTING SYSTEM

FIELD OF THE INVENTION

The present invention relates to a spelling error correcting system to be used for automatically correcting wrongly spelled words or for advising an operator of correct spellings.

PRIOR ART

In order to reduce the load of text or data input into computers, there have been proposed a variety of input techniques such as OCR, speech input, etc., in addition to improvements to existing text editors. However, no prior techniques have succeeded in avoiding input errors completely and required indispensably to check and correct wrong spellings after inputting. Therefore, there have been developed programs for finding wrongly spelled words and then proposing to the operator candidate words which are assumed to be correct for each of the input character strings.

Practically, the efficiency of such programs would be decided by a process of selecting candidate words, namely words having relatively similar spellings, for each input character string. The candidate words are then matched in detail with the input character string to determine a correct word. In the simplest technique, all words in a dictionary are used as candidates. Each of the words are matched with an input character string according to a predetermined formula of distance, and the similarity to the input character string is calculated. However, since most of practical dictionaries each have a size of more than ten to twenty thousand words, the above technique is not practical in view of its high computing cost. Therefore, the following techniques, for example, have been proposed for narrowing down the range of candidate words prior to performing detailed matching.

(1) Only the words having the same leading character as that of an input word and having differences of length of less than a certain length (generally, one to three characters) from the length of the input word are used as candidates.

This technique is widely adopted in programs now in practical use, for example in IBM's Word Proof.

The above technique (1) is based on the assumption that the leading character in an input word would have the highest reliability. This assumption would be proper to some extent in case of keyboard inputting. However, in case of OCR, the assumption is not always satisfied since a correct word may be omitted from candidate words due to an error in the top character. Further, since the decreasing rate of candidate words is low, it would generally be necessary to employ another technique combined therewith, such as the technique of avoiding those of lower possibilities according to the statistics of misspelling.

(2) The value of an input word is calculated from the spelling of the word according to a predetermined formula by assigning a fixed numeric value to each character in the word, and the value of the word is used as a hashing key. The words having differences of values within a certain range are used as candidates.

This technique is described in an article by W. S. Rosenbaum and J. J. Hilliard entitled "Multifont OCR Postprocessing System," IBM Journal of Research and Development, Vol. 19, No. 5, pp. 398–421, July 1975. It is detailed especially on pp. 403–404.

The above technique (2) requires further consideration in view of the fact that a correct word may be omitted although its cost for searching is low. Although it has been considered which numeric value should be assigned to each character, a correct word may be omitted in the worst case even for an input character string in which only one character is replaced.

(3) A character category set obtained from an input word and a character category set obtained from each word are compared as to each component and the words having differences within a certain range are used as candidates. A set having, as its components, all character categories included in a word is defined as a character category set.

This technique is described in detail in Japanese Published Examined Patent Application No. 59-29910 (U.S. Pat. No. 4,355,371).

The above technique (3) assures that there would not be any omission of correct words provided the characters are replaced only within a certain threshold. However, this technique requires to compare a character category set of an input character string and that of each word. Although the computing cost per comparing operation would be relatively low, the computing cost could not be ignored when tens of thousands of words are provided.

SUMMARY OF THE INVENTION

In consideration of the above circumstances, the object of the present invention is to provide a spelling error correcting system which assures that a correct word would be included in the candidate words determined based on the spelling of an input word provided the input word includes only the replacement, deletion or addition of characters within a predetermined threshold, and which could hold down the number of operations required to determine the candidate words to the minimum.

The above object of the present invention can be accomplished by a technique of selecting candidate words based on specified combinations of character categories in the character category sets of each word.

The specified combinations of character categories are determined as follows.

(1) The character categories included in an input word are sorted based on a predetermined rule.

(2) The n (an integer) leading character categories in the sorted character categories are selected.

(3) The combinations of character categories, each consisting of m (m is an integer satisfying m<n) character categories out of said n character categories where < mean less than, are generated.

The words in a dictionary have been stored therein, classified according to thus extracted combinations of character categories. Since one word has generally a plurality of combinations of character categories, one word would generally be classified into a plurality of groups.

The selection of candidate words for an input word can be made by taking out the words included in one class or a plurality of classes (generally, a plurality of classes) specified by the combinations of character categories extracted from the input word.

In the present invention, the combinations of character categories stated above may be considered as attributes of words. The attributes cannot be changed entirely so long as the replacement, deletion, or addition of characters of a word is within a predetermined range. Namely, at least one combination of character categories would remain even if such a misspelling has been made. Accordingly, a correct word would be included in one of the classes specified as stated above.

The present invention assures that a correct word would always be included in candidate words so long as the replacement, deletion, or addition of characters is within a predetermined range, and yet that the classes of candidate words could be determined uniquely from the attributes of an input word, without requiring complicated calculations especially.

BRIEF DESCRIPTION OF THE DRAWINGS

FIG. 4 shows a flow chart for explaining a class generating portion 9 shown in FIG. 3.

DETAILED DESCRIPTION OF THE INVENTION

The present invention will be explained below with reference to an embodiment applied to a text input system employing an OCR for printed alphanumeric characters. It should be understood, however, that the present invention can also be applied to other input systems.

Figure 1:
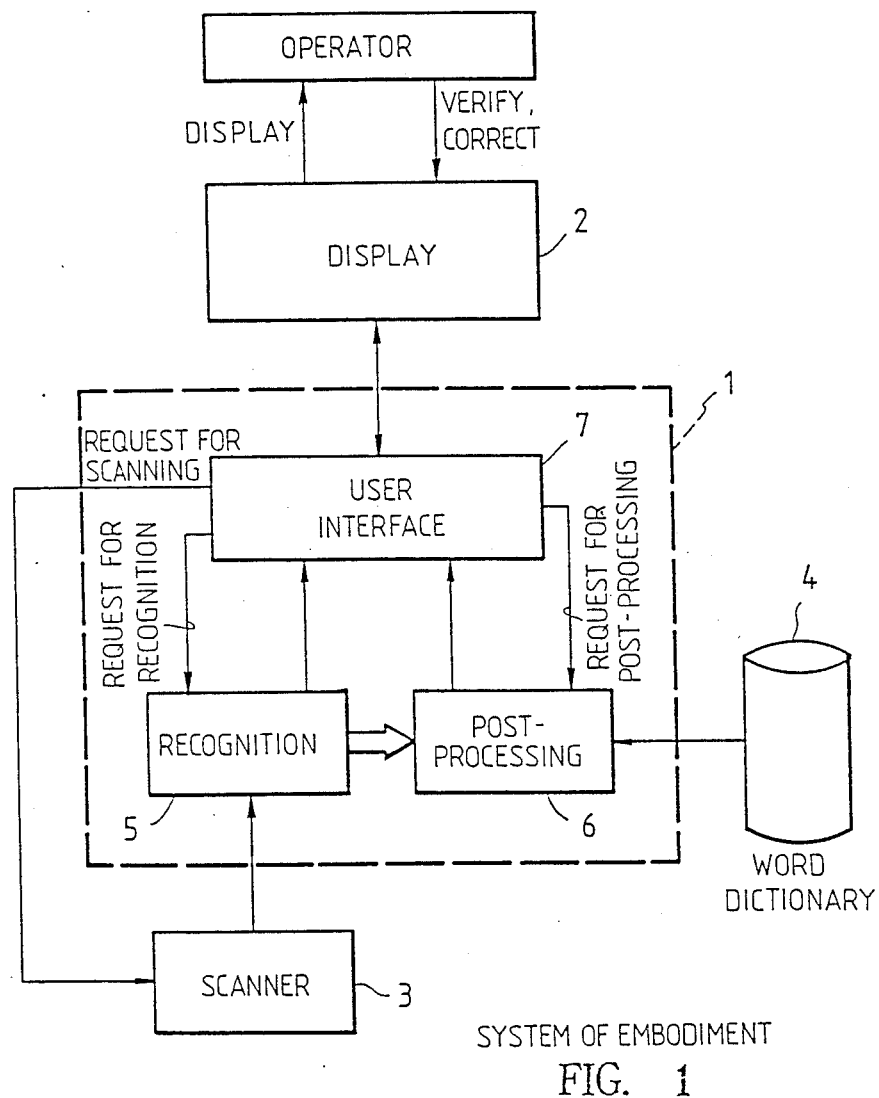
FIG. 1 shows a block diagram illustrating generally an embodiment of the present invention.

FIG. 1 generally shows the structure of the embodiment. In FIG. 1, the system comprises a personal computer 1, a bit map display 2, a scanner 3, and an auxiliary memory 4. The blocks within the broken line, namely a recognizing portion 5, a post-processing portion 6, and a user interface portion 7, have been implemented as software. Practically, the recognizing portion 5 may be implemented with hardware. The post-processing portion 6, which is directly related to the present invention, may be implemented as software without causing any problems in the amount of computation or in the processing speed, as will be understood from the following description of the present invention.

Figure 2:
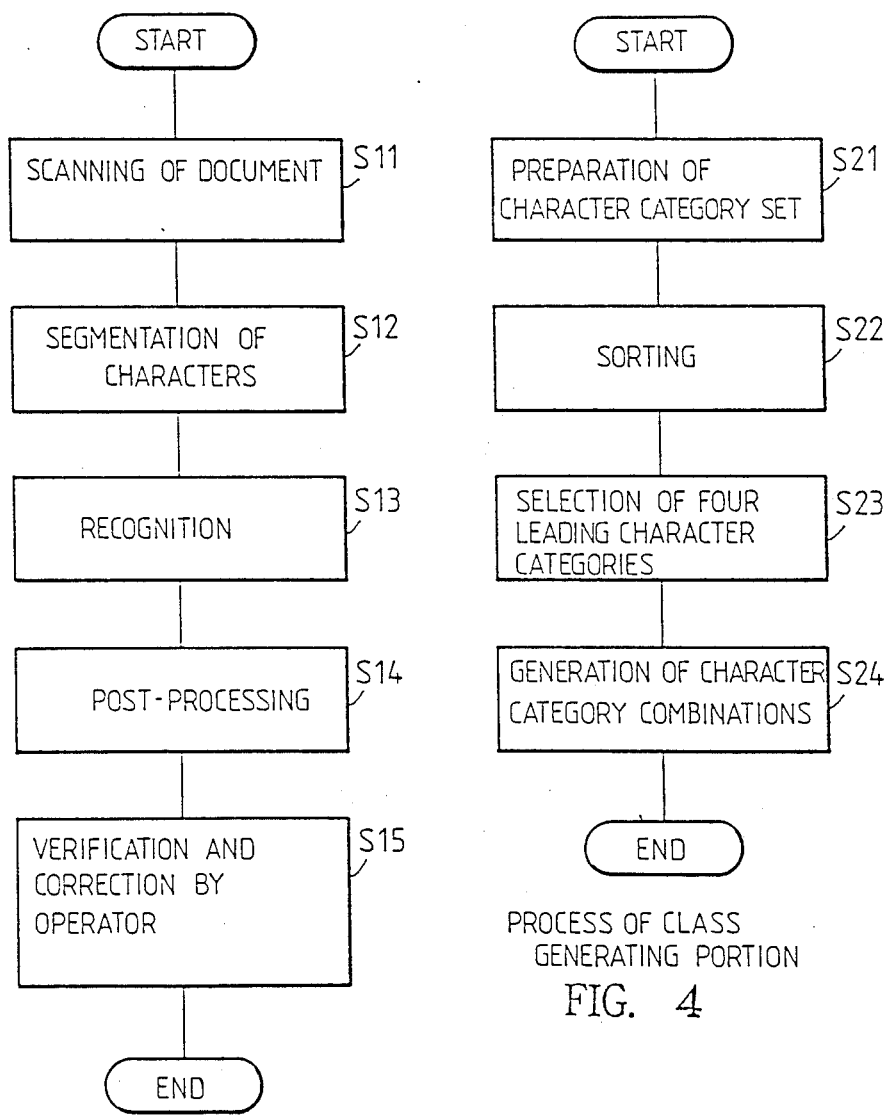
FIG. 2 shows a flow chart illustrating the procedure of the embodiment shown in FIG. 1.
Figure 3:
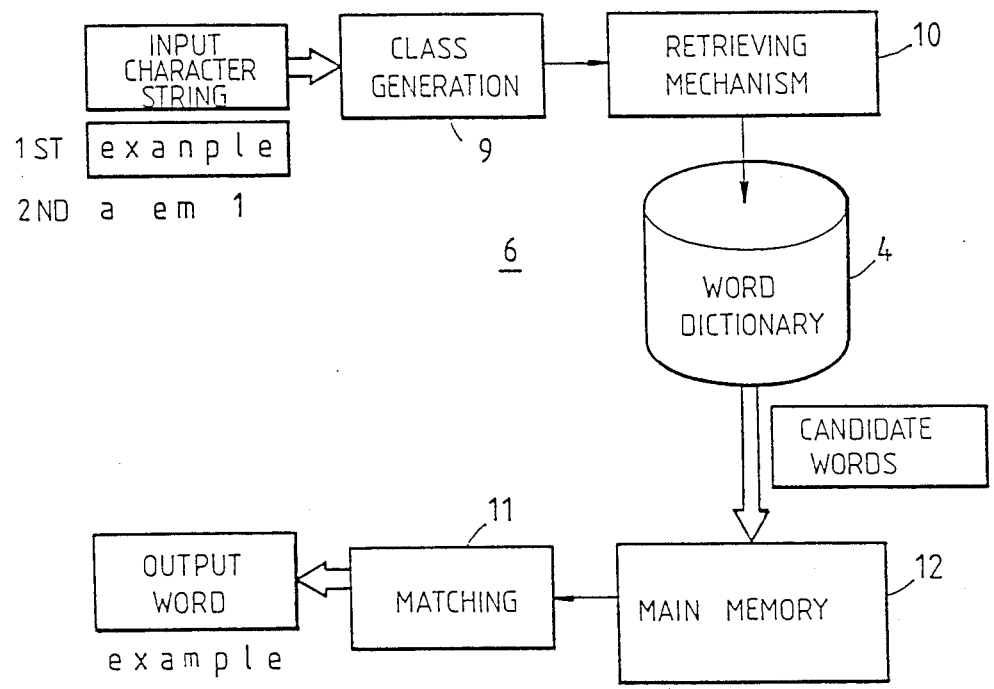
FIG. 3 shows a block diagram illustrating a post-processing portion 6 shown in FIG. 1 in detail.

FIG. 2 illustrates the procedure of the system shown in FIG. 1. In FIGS. 1 and 2, when an operator issues a processing start command, the user interface portion 7 first supplies a scanning request to the scanner 3. A text 8 is scanned by the scanner 3 and supplied to the recognizing portion 5 as an image (S11). The recognizing portion 5 segments the image by characters (S12), and then recognizes which character is the image of the segmented character (S13). The results of the recognition are not always uniquely determined and a plurality of candidate words may be outputted. In FIG. 3, as will be explained later, the first ranked candidate character string, i.e., example, is shown encircled. After the recognition of one character, the user interface portion 7 supplies to the post-processing portion 6 (see FIG. 1) a request for checking and correcting spelling errors as the result of the recognition. The post-processing portion 6 executes the determination of the spelling by referring to the word dictionary in the auxiliary memory 4 as to the recognition result supplied from the recognizing portion 5, and if the proper word cannot be found in the dictionary, any word having approximately the same spelling is retrieved in step (S14), as shown in FIG. 2). This portion is directly related to the present invention and will be explained later in more detail. The result of the step 14 is displayed on the display 2 through the user interface portion 7 to be finally recognized and corrected by the operator in step (S15). Thus, a coded correct text can be obtained.

Next, the post-processing portion 6 which is directly related to the present invention will be explained. The post-processing portion 6 has the following two functions.

(1) The portion checks whether or not an input character string is correctly spelled as a word (whether or not it exists in the dictionary).

(2) The operation retrieves words having spellings similar to that of the input character string (or the recognition result itself).

Since the above function (1) can be understood as a subset of the function (2), only the function (2) will be described below.

FIG. 3 illustrates the post-processing portion 6 in detail. In the figure, the post-processing portion 6 comprises a class generating portion 9, a retrieving mechanism 10, a matching portion 11, and a main memory 12 of the personal computer 1. In this configuration, the first ranked candidate character string as the result of the recognition is first supplied to the class generating portion 9. The class generating portion generates classes as will be explained later in detail. The retrieving mechanism 10 retrieves the word dictionary in the auxiliary memory 4 by using the generated classes as the keys and selects candidate words to be transferred to the main memory 12. Each candidate word obtained is matched with the input character string (or the recognition result) by the matching portion 11, and if the matching distance is within a threshold, the word is outputted as a likely word.

Next, the important portions of the post-processing portion 6 is described in more detail in sequence.

Class Generating Portion 9

FIG. 4 illustrates the processing procedure of the class generating portion 9. A "class" may be defined as a combination of m character categories (m is an integer, for example 3). For example, (a, b, c) and (d, e, f) each form one class. When we say that a given word belongs to a specific class, it means that the combination of character categories which specifies the class exists among the combinations of the character categories obtained from the word by the procedure to be stated below. Now, referring to FIG. 4, the processing of the class generating portion 9 will be explained.

Step S21

A character category set for a word is prepared from the spelling of the word. As stated before with reference to the prior art, the character category set is a set having, as its components, all character categories included in the word.

(EXAMPLE)

example→(a, e, l, m, p, x)

apple→(a, e, l, p)

of→(f, o)

Step S22

The character category set is sorted based on a predetermined rule. In this example, the ascending order of frequency of appearance of each character, without considering the frequency of appearance of each word, is employed. The following table 1 shows the order of frequency of appearance of each character.

(EXAMPLE)

| (a, e, l, m, p, x) | → | [x, p, m, l, a, e] |
|---|---|---|
| (a, e, l, p) | → | [p, l, a, e] |
| (f, o) | → | [f, o] |

TABLE 1

Frequency Order of Character Categories
(in the Ascending Order)

| 1 | 2 | 3 | 4 | 5 | 6 | 7 | 8 | 9 | 10 | 11 | 12 | 13 |
|---|---|---|---|---|---|---|---|---|---|---|---|---|
| j | q | x | z | w | k | v | f | b | y | g | h | p |
| 14 | 15 | 16 | 17 | 18 | 19 | 20 | 21 | 22 | 23 | 24 | 25 | 26 |
| m | d | u | c | s | l | t | o | n | r | i | a | e |

Step S23

A character category subset comprising the four leading character categories of the sorted components is generated. However, if the number of the components in the character category set is less than four, blank characters are added to form a four character category set. A plurality of blank characters may be added as required. The blank character is indicated as "-" in the following example.

(EXAMPLE)

| [x, p, l, m, a, e] | → | (x, p, m, l) |
|---|---|---|
| [p, l, a, e] | → | (p, l, a, e) |
| [f, o] | → | (f, o, —, —) |

Step S24

As stated above, a combination of three character categories is defined as one class. All the combinations of three character categories which can be formed by using the components of the character category subsets of the word are generated. Generally, four combinations are generated. It is defined that the word belongs to the class or classes corresponding to the obtained combination or combinations of three character categories. In case of the English language, which has twenty-seven character categories including the blank character, there would exist 2951 ($=_{27}C_3+26$) classes in total, to one or more (generally, four) of which each word belongs.

(EXAMPLE)

The "apple", of which the character category subset is (p, l, a, e), belongs to four classes of (a, l, p), (e, l, p) (e, a, p), and (e, a, l).

The word dictionary has been formed so as to be retrieved according to thus generated classes. Now, the retrieving mechanism 10 and an example of the structure of the dictionary will be described below.

Retrieving Mechanism 10 and Example of Structure of Dictionary

Figure 5:
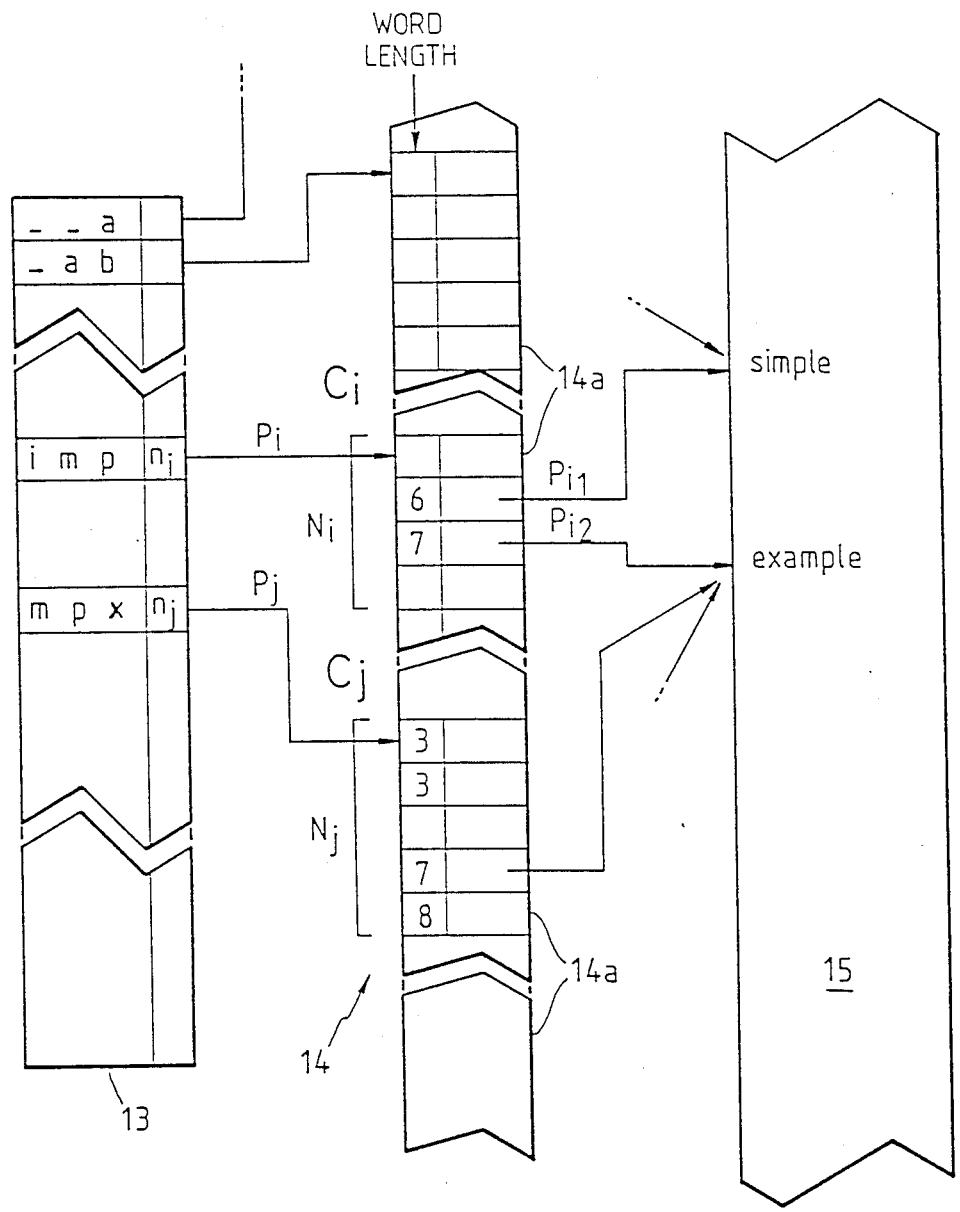
FIG. 5 shows a schematic diagram illustrating an example of a word dictionary which is accessed by the retrieving mechanism 10.

FIG. 5 illustrates an example of the structure of a dictionary. In FIG. 5, the dictionary comprises a first index portion 13, a second index portion 14, and a dictionary body 15. The first index portion 13 has entries which respectively correspond uniquely to classes, i.e., combinations of three character categories, e.g., (a, b, c), and has stored in each of them a head pointer pointing to the second index portion of the class and the number N of the belonging words. The second index portion 14 has a plurality of partial areas 14a each corresponding to each class. Each of the entries of the partial areas 14a in the second index portion 14 corresponds uniquely to each word and has a pointer to the dictionary body 15 and the length of the word. Of course, the second index portion 14 may have additional information for further narrowing down candidate words. The entries have been sorted by using the pointer to the dictionary body 15 and the length of each word as the key, and all of the entries in one partial area can be accessed by reading out N characters in sequence from the top pointer obtained from the first index portion 13. The dictionary body 15 includes spellings of words and other information, and can be directly accessed by the pointer of each of the entries in the second index portion 14.

Further, in the above structure of the dictionary, it is preferred that the words belonging to each class are classified into the group of the words each having, as its three leading character categories, the three character categories specifying the class, and the group of the other words. This would avoid extra retrieving operations when spellings are only checked to be correct or not. Namely, the spelling of an input word can be checked to be correct or not only by performing matching by using, as candidates, only the words having the same three leading character categories as those of the input word. If a word having the same three leading character categories as those of the input word has been found, the input word is determined to be correctly spelled, and if not, the input word is determined to be wrongly spelled. When spelling errors are to be checked by using the dictionary illustrated in FIG. 5, a class is specified by the combination of three leading character categories of the input character string, and only the words having the combination of three leading character categories in the class are used to perform matching. Thus, unnecessary retrieving operations would be avoided by dividing the class into two groups. Besides such three leading character categories, other three character categories in other specified column positions may also be used as a rule.

Next, how the retrieving mechanism 10 accesses thus structured dictionary will be explained with reference to an example. Now, let a character category subset be (x, p, m, l). When the retrieving mechanism 10 receives the class of (l, m, p) from the class generating portion 9, the retrieving mechanism 10 obtains the number Ni of the words belonging to the class (l, m, p) from the first index portion 13, and the top pointer pi to the partial area 14a (indicated by Ci) in the second index portion 14 wherein the information of the words are stored. Then, the retrieving mechanism 10 accesses the partial area Ci with the pointer pi, and retrieves the words having differences of lengths within a predetermined threshold from the input character string by sequentially scanning the partial area to obtain the pointer pik (k=1, ..., Ni) to the proper words in the dictionary body 15. Then, the retrieving mechanism 10 tracks the pointers to the dictionary body 15, and reads the spellings of the words such as simple, example, etc., to be transferred to the main memory 12.

Further, as to other combinations of three character categories of (m, p, x), (l, p, x), and (l, m, x), proper words are selected and transferred in the same way. In this case, there would exist some duplicated words as apparent from the definition of a class. For example, the word "example," which belongs to each of the classes (l, m, p), (m, p, x), (l, p, x), and (fl, m, x), would be transferred four times. The retrieving mechanism 10 has also the function of checking and avoiding such duplicated retrieving operations.

As stated above, according to the present invention, the selection of candidate words can be made by the class generating portion 9 and the retrieving mechanism 10 based on an input character string. The following table 2 shows candidate words thus obtained for various input character strings. In the table, only the candidate words each having a difference of length within 1 from that of the input character string have been selected. The dictionary has a size of approximately 11000 words.

TABLE 2

Input Character Strings and
Examples of Selected Candidate Words

| Input Character Strings | example | example | example | example |
|---|---|---|---|---|
| Character Category Subsets | xpml | xpln | xpla | xpms |
| Candidate Words | example | example | example | example |
| | sample | explore | expel | expanse |
| | trample | explode | maple | postman |
| | temple | expense | exalt | glimpse |
| | simple | expanse | lapse | pajamas |
| | dimple | planet | ample | express |
| | compel | pencil | perplex | expense |
| | explore | expand | appeal | pessimism |
| | explode | explain | pearl | empress |
| | compile | plainly | panel | promise |
| | exclaim | external | plane | pastime |
| | explain | perplex | apple | persimmon |
| | climax | airplane | plate | expansion |
| | employ | appendix | place | exposure |
| | employee | | apply | complex |
| | playmate | | paddle | impress |
| | promptly | | explore | tempest |
| | implore | | explode | compose |
| | smallpox | | petal | compass |
| | template | | pedal | presume |
| | pamphlet | | appall | supreme |
| | employer | | please | impulse |
| | monopoly | | palace | symptom |
| | complex | | plead | baptism |
| | pilgrim | | relax | smallpox |
| | problem | | explain | optimism |
| | perplex | | apparel | emphasis |
| | complete | | appeal | shipment |
| | platinum | | repeal | steamship |
| | platform | | asleep | september |
| | imperial | | | explosion |
| | proclaim | | | expensive |
| | complain | | | explosive |
| | | | | primrose |
| | | | | imprison |
| | | | | specimen |
| | | | | composer |
| | | | | compress |
| | | | | comprise |
| | | | | imposing |
| | | | | sixpence |
| | | | | sportsman |
| | | | | imperious |

TABLE 2-continued

Input Character Strings and
Examples of Selected Candidate Words promising

Matching Portion 11

The matching portion 11 collates the selected candidate words and the input character string (or the recognition result) and measures to what extent they are similar. Any of the conventional methods may be adopted for the collation and the details will not be explained here since they would be apparent to the skilled in the art.

Finally, the advantages of the present embodiment of the invention may be summarized as follows.

(1) The technique does not rely on whether or not characters in specific positions in a word are correct. Especially, it is superior to the prior art (1) which is most widely used among the conventional methods in the point that it is independent of whether or not the leading character of a word is correct.

(2) The processing is easy. It would require a retrieving cost no more than that required in the hashing technique since the operations for obtaining character category subsets are made only by determining character categories in an input character string and performing set operations and also the number of components would be several at the most. Further, in accessing the dictionary, it is not required to access the dictionary body in the process of selecting candidate words and most of the processing would require only sequential access to the second index portion. There would be no practical problems in the access of the dictionary (the auxiliary memory 4).

(3) A correct word would always be included in candidate words provided the replacement, deletion or addition of characters is within a threshold (n−m) determined by the number of components (n) of a character category set used and the number of components (m) of the combinations of character categories. Even for replacements out of the threshold, it would be quite rare that words would be deformed so that the character category subsets would be largely changed under a proper rule for sorting (Although the present embodiment employs the rule of the ascending order of frequency in order to increase the reducing rate of the candidate words, the difficulty of occurrence may be employed as the rule or other alternative.). Accordingly, the possibility that a correct word would be omitted from candidate words would be quite low.

(4) The retrieving operations required for checking spellings can be reduced by dividing the words in each class into two groups in consideration of m leading character categories.

(5) Candidate words can be narrowed down efficiently since they are selected taking into consideration lengths of words as well as classification by combinations of character categories.

As explained above, according to the present invention, specifc combinations of components of the character category set of a word are used as the attributes of the word and the words in the dictionary are sorted based on the attributes. On the other hand, similar attributes are extracted from an input word and the words of the class having the same attributes are taken out of the dictionary as the candidate words for the input word. Therefore, the candidate words can be obtained with a less computing amount. Further, the present invention assures the correction of spelling errors by replacement, deletion or addition of characters within a predetermined range based on the above rule of generating combinations.

While the present invention has been described above with reference to an embodiment thereof, it should be understood that the present invention is not limited thereto but various changes can be made without deviating the scope and gist of the present invention. For example, the character categories are not limited to English characters. The inputting may be made by using speech recognition or a keyboard. The number of components n of a character category subset or the number of components m of a character category combination may be changed variously. As the rule for sorting, other statistic information may be employed. Further, various structures may be adopted for the dictionary.

What is claimed is:

1. A spelling error correcting system characterized by comprising:
    means for storing a number of correctly spelled words, each of which can be read with one or more combinations of character categories, each combination consisting of m (m is a constant satisfying m< n) character categories out of n (n is a constant) leading character categories of the character categories included in the word and sorted based on a predetermined rule associated with character categories;
    means for automatically sorting character categories included in an input word based on said rule for sorting;
    means for automatically obtaining all combinations of m character categories out of n leading character categories of said sorted character categories;
    means for reading from said storing means correctly spelled words based on each of said obtained combinations of character categories; and
    means for matching said input word with each of said read words, said read words having a length within one from that of the input word.

2. A spelling error correcting system as described in claim (1), wherein:
    said n character categories may include one or more blank characters.

3. A spelling error correcting system as described in claims (1), or (2), wherein: said storing means comprises a main storing portion which stores correctly spelled words and an index portion which specifies storing positions in said main storing portion based on said combinations of character categories.

4. A spelling error correcting system as described in claim (3), wherein:
    said index portion narrows down the range of words to be read, according to the character categories in predetermined m string positions of said sorted character categories in said input word.

5. A spelling error correcting system as described in claim (4), wherein:
    said predetermined m string positions are m leading positions.

6. A spelling error correcting system as described in claims (3), (4), or (5), wherein:
    said index portion narrows down the range of words to be read, according to the length of said input word.

7. A spelling error correcting system characterized by comprising:
    means for storing a number of correctly spelled words, each of which can be read with one or more combinations of character categories, each combination consisting of m (m is a constant satisfying m less than n) character categories out of n (n is a constant) leading character categories of the character category included in the word and sorted based on a predetermined rule associated with character categories;
    said rule for sorting is the ascending order of frequencies of appearance of character categories;
    means for sorting character categories included in an input word based on said rule for sorting;
    means for obtaining all combinations of m character categories out of n leading character categories of said sorted character categories, said n character categories may include one or more blank characters;
    means for reading from said storing means correctly spelled words based on each of said obtained combinations of character categories; and
    means for matching said input word with each of said read words.

* * * * *